Figure 1:
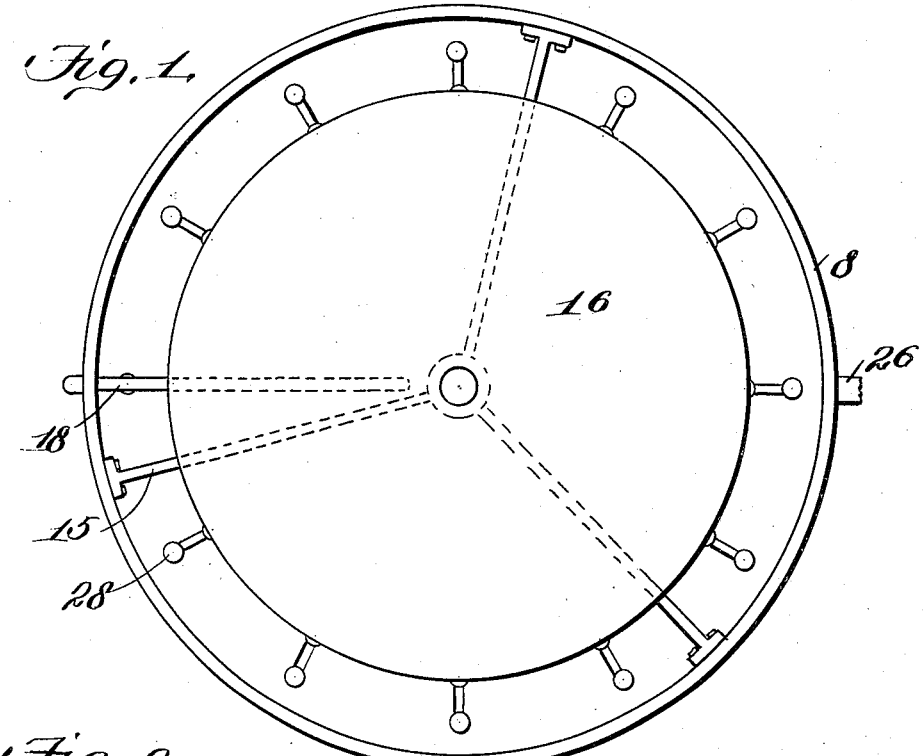

No. 880,426. PATENTED FEB. 25, 1908.
H. P. TAYLOR.
FILTERING APPARATUS.
APPLICATION FILED OCT. 8, 1906. RENEWED JUNE 19, 1907.

2 SHEETS—SHEET 1.

Witnesses
Inventor
Harry P. Taylor
By James L. Norris
Atty.

No. 880,426. PATENTED FEB. 25, 1908.
H. P. TAYLOR.
FILTERING APPARATUS.
APPLICATION FILED OCT. 8, 1906. RENEWED JUNE 19, 1907.
2 SHEETS—SHEET 2.
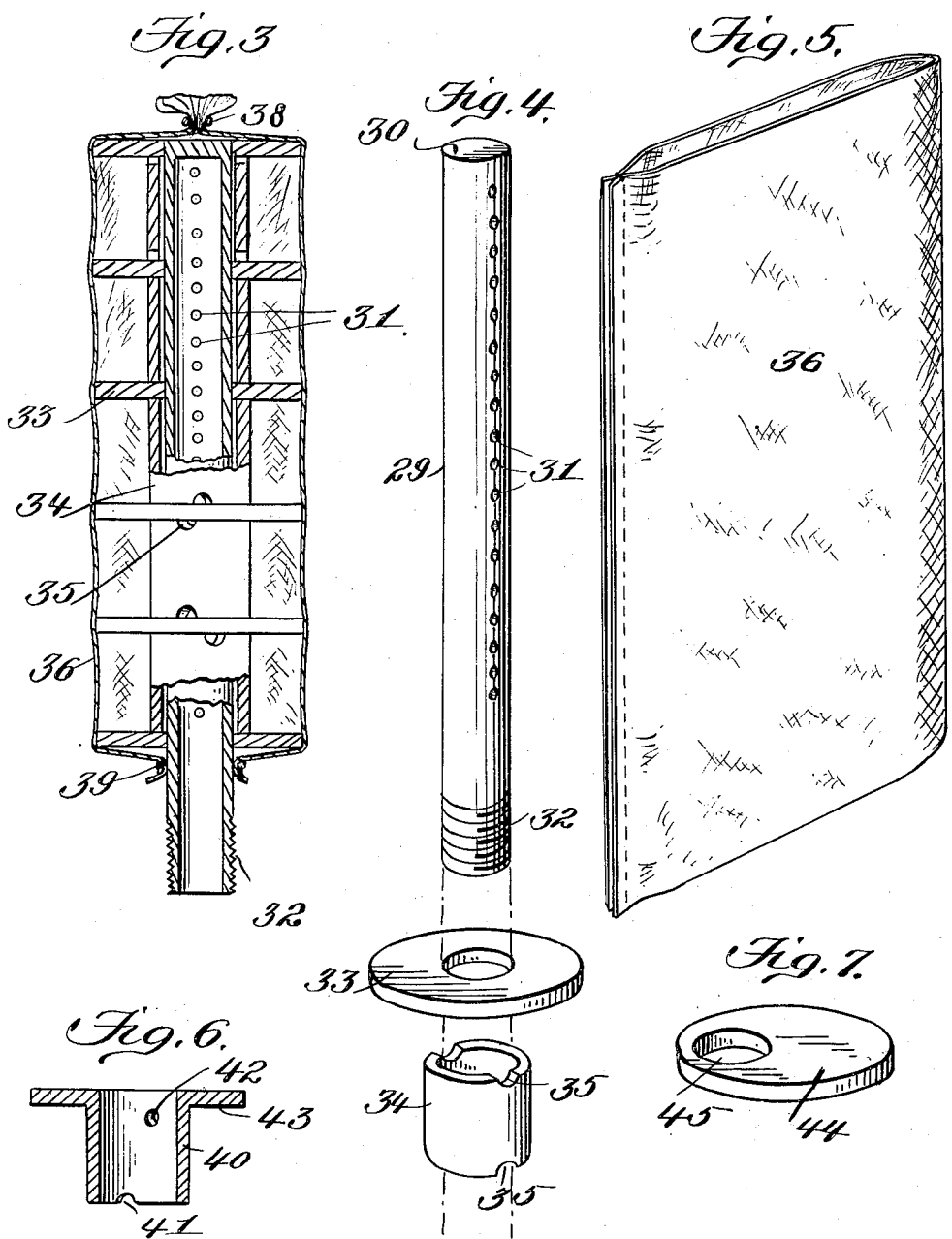
Witnesses:
Inventor
Harry P. Taylor
by James L. Norris
Atty United States Patent Office.

HARRY P. TAYLOR, OF SALT LAKE CITY, UTAH.

FILTERING APPARATUS.

No. 880,426.   Specification of Letters Patent.   Patented Feb. 25, 1908.

Application filed October 8, 1906, Serial No. 338,003. Renewed June 19, 1907. Serial No. 379,797.

*To all whom it may concern:*

Be it known that I, HARRY P. TAYLOR, a citizen of the United States, residing at Salt Lake City, in the county of Salt Lake and State of Utah, have invented new and useful Improvements in Filtering Apparatus, of which the following is a specification.

This invention relates to filtering apparatus, more particularly to that class employed in the treatment of ores by the cyanid process, and aims to provide in a manner as hereinafter set forth a new and improved form of filtering member which shall be simple in its construction and arrangement, strong, durable, efficient in use, obtain a maximum filtering area with minimum space, readily set up and removed when occasion so requires, and inexpensive to manufacture.

The invention further aims to provide in a manner as hereinafter set forth means for causing the circulation of the material to be operated upon, thereby facilitating the filtering step; and furthermore, to provide means in a manner as hereinafter set forth to constitute a spreader and amalgamator for the material being treated so that the material is thoroughly aired and to enable the catching of any coarse gold, if a gold ore is being treated.

The invention further aims to provide a filtering apparatus in a manner as hereinafter set forth to enable the employing of a cyanid solution as a means for circulating the material to be treated so as to facilitate the filtering operation.

With the foregoing and other objects in view the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In describing the invention in detail, reference is had to the accompanying drawings wherein like reference characters denote corresponding parts throughout the several views, and in which:—

Figure 2:
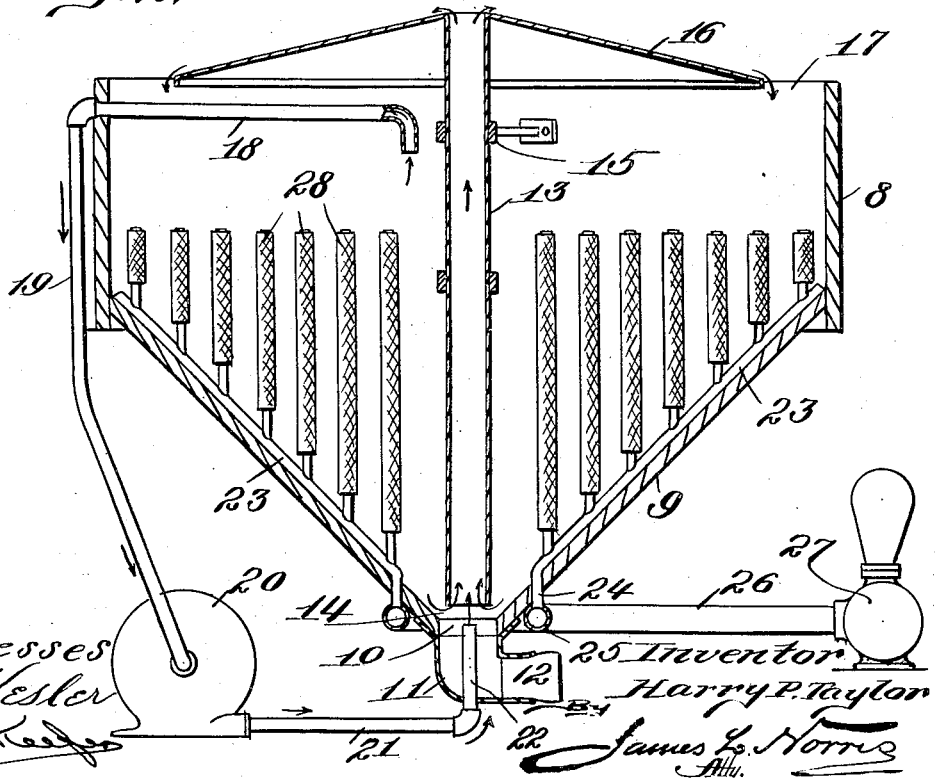

Figure 1 is a top plan view of a filtering apparatus in accordance with this invention; Fig. 2 is a vertical sectional view thereof; Fig. 3 is a sectional elevation of the filtering member; Figs. 4 and 5 are details of the filtering member; Fig. 6 is a modification of one of the elements of the filtering member; and Fig. 7 is a like view of another modification.

Referring to the drawings by reference characters, 8 denotes a receptacle or tank in which the filtering operation is carried on and the said receptacle or tank 8 is provided with an inverted cone-shaped bottom 9 having an opening 10 constituting an outlet for the material. To the bottom 9 of the receptacle or tank 8 is secured an L-shaped discharge pipe 11 which communicates at one end with the opening 10, and at its other end is closed by a removable plug 12.

Arranged centrally of the receptacle or tank 8 and in alinement with the opening 10 and pipe 11 is a vertically extending stand pipe 13 which is of such length as to project above the top edge of the receptacle or tank 8. The stand pipe 13 terminates at its lower end at a point removed from the opening 10 or bottom 9 of the receptacle or tank 8, thereby forming a passage 14. The stand pipe 13 is secured within the tank or receptacle 8 by a spider 15, although other suitable means than the spider can be employed. The stand pipe 13 at its upper end terminates in a cone-shaped member 16 which constitutes a spreader and amalgamator, and the said cone-shaped member 16 is of much less diameter than the tank or receptacle 8 so as to form a passage 17 to permit of the material discharging off from said cone-shaped member and into the tank or receptacle 8. The material to be treated is drawn from the bottom portion of the tank or receptacle 8 and is carried up through the pipe 13 and discharged out of the pipe 13 over and upon the cone-shaped member 16 and then falls through the passage 17 into the tank or receptacle 8. This action causes a circulation and a thorough agitation of the material. The material is caused to circulate in a manner as stated through the medium of the solution employed, and in this connection it will be stated that the solution is drawn off from the upper end of the tank or receptacle 8 and is then forced into the tank or receptacle 8 at the bottom and up and through the stand pipe 13, such action will cause the solution to take up the material at the bottom of the tank or receptacle and force the material up through the stand pipe 13 and over the cone-shaped member 16, back into the tank or receptacle 8.

To provide for the drawing off of the solution from the tank or receptacle 8 so as to obtain the circulation of the material, a suction pipe 18 is provided which is arranged below the cone-shaped member 16 and above the filtering members to be hereinafter referred to. The suction pipe extends through the wall of the tank or receptacle and communicates with a branch 19, the latter opening into a suction device or pump 20. The discharge pipe for the suction device or pump 20 is indicated by the reference character 21, the latter terminates in a vertically extending branch pipe 22. The branch pipe 22 extends through the discharge pipe 11 and up into the opening 10 and is positioned substantially in alinement with the center of the standpipe 13.

From the foregoing arrangement of parts it is evident that when the suction device or pump 20 is operated the solution will be drawn from the upper portion of the tank and forced into the tank at the bottom thereof, and thereby obtain the circulation of the material in a manner as stated. The cone-shaped member 16, as above stated, constitutes a spreader and amalgamator, and the function thereof is to cause a thorough airing of the material, oxygen being necessary to cyanid extraction. Furthermore, the spreader and amalgamator acts as a means for catching coarse gold if a gold ore is being treated.

Arranged within the receptacle or tank 8, and suitably secured to the bottom thereof, is a series of leading off pipes 23 which are closed at their upper ends and at their lower ends extend down through the bottom 9, as at 24, and open into a receiving pipe 25, the latter communicating with a suction pipe 26 which empties into a pump 27. The pipe 25 is substantially concentric in contour and is positioned in close proximity to the opening 10 formed in the bottom 9. The pipe acts as a common receiving pipe for all of the leading off pipes.

Each of the leading off pipes 23 communicate with a series of filtering members. These members are indicated by the reference character 28. The filtering members 28 gradually increase in length towards the center of the receptacle or tank 8. As shown each of the leading off pipes 23 has connected thereto seven filtering members, but this number can be increased or diminished as desired, and each of the filtering members are cylindrical in cross section, as it has been found from experiment that a cylindrical or circular filtering member occupies less than one-half the space for the same filtering area than a rectangular filtering member, thus obtaining the maximum filtering area with the minimum of space. Each of the filtering members 28 are detachably connected to its respective leading off pipe 23.

Each of the filtering members consists of a hollow tube 29 closed at its upper end, as at 30, and is provided with a series of openings 31 to permit of the passage of the cyanid solution, and at its lower end formed with exterior screw-threads, as at 32, which permits of detachably connecting the tube 29 to a leading off pipe, the leading off pipe being provided with screw-threaded openings to receive the screw-threaded lower end of the tube 29. Surrounding the tube 29 is a series of washers 33 retained a suitable distance apart through the medium of spacing collars 34 which are interposed between each pair of washers 33, and each of the spacing collars 34 is provided in each edge with a pair of semi-cylindrical notches 35 which form ports for the passage of the cyanid solution.

The reference character 36 denotes an envelop of any suitable fabric, or equivalent material, preferably canvas. The envelop 36 is open at its top and bottom, and the said envelop 36 is adapted to receive that portion of the tube 29 surrounded by the collar 24 and washers 33. The upper end of the envelop 36 is closed through the medium of a suitable holdfast device, as at 38, preferably by a flexible member employed to tie the upper end of the envelop 36 together. The lower end of the envelop 36 is secured around the tube 29 by a suitable flexible member 39.

In Fig. 3 of the drawings the washers 33 and collars 35 are shown independent of each other, whereas, in Fig. 6 the collars and washers are formed integral with each other, and in Fig. 6, 40 denotes the spacing collar having its lower edge notched, as at 41 and its sides provided with an opening 42. The washer is indicated by the reference character 43 and is formed integral with the collar 40.

In lieu of employing the washers shown in Figs. 3 and 4 with a centrally arranged opening through which the tube 29 is passed, the opening in the washer can be placed eccentrically, by way of example, such form of washer is shown in Fig. 7, and in this connection the reference character 44 denotes the washer and the reference character 45 the eccentrically arranged opening. Although the tube 29 is shown inclosed in an envelop of canvas, yet the tube 29 can be covered in many different ways, for example, by cocoa-matting, rope, burlap, with strips running lengthwise, and then covered with a filtering means so as to make a substantial whole. In lieu of making the member 29 hollow the same can be formed of a solid piece, with a drain down its side opening into the leading off pipe.

The operation of the filter is as follows:—
The filtering members are made of such length that they will always be under surface of the pulp in the tank, though the solution be all filtered off. This arrangement of filtering members applies only to the suction process. If the suction is not employed the filtering members can run to the top of the tank. The pulp and solution are let into the tank. The suction device or pump 20 is started and will cause the drawing off of the solution at the top of the receptacle or tank and the discharge back into the tank at the bottom, and up into the stand pipe 13. The arrangement of the suction pipe 18 in the manner as pointed out relieves the suction device or pump of the heavy sands, as the suction pipe 18 has the inlet thereof near the top of the tank. The discharge of this solution back into the tank is had at such velocity as to carry the material or pulp up through the stand pipe 13, and discharges the pulp or material onto the cone-shaped member 16, which constitutes the spreader, aerator and amalgamator, and if any coarse gold is present the member 16 amalgamates it and consequently shortens agitation. The member 16 conducts the pulp or material back into the tank. The circulation, as well as the agitation of the material in a manner as stated, is continued as long as is desired. The filtering is started at any time.

By the arrangement of the suction device or pump in a manner as set forth the circulation and agitating of the material can be stopped and resumed at any time, and this is very advantageous as oftentimes machinery has been stopped temporarily in a plant and unless the agitator can be stopped and started at will, the agitation cannot be resumed and a loss occurs.

After circulation and agitation of the pump or material has continued the desired time, the suction device or pump 20 is stopped and the moisture sucked out, then the displacement solution is run on and as much sucked through as is wanted, then the wash water is handled in the same manner. At any time the filtering members need cleaning, the solution can be forced back through them and they can thus be thoroughly cleaned.

The stand pipe 13 may be provided with a screw cap at the top thereof for closing it, in order to force the material or loosen it in the tank, if the material is exceptionally hard to get in circulation.

Although the preferred form of filtering member is cylindrical as illustrated in Fig. 3, yet it will be understood that any form of filtering member suitable for the purpose can be employed.

What I claim is—

1. A filtering apparatus of the character described, embodying a filtering member, consisting of a central core having an outlet, washers surrounding said core, spacing collars for the washers, said spacing collars provided with channels, and an envelop for the spacing collars, washers and core.

2. A filtering apparatus of the character set forth, comprising a plurality of filtering members communicating with an outlet, a stand pipe, a receptacle for said members and stand pipe, and means communicating with the top and bottom of said tank and adapted to force the material up through said stand pipe, thereby causing the circulating and agitating of the material.

3. A filtering apparatus, comprising a tank adapted to receive the material to be treated and a suitable solution, filtering members arranged within said tank, a stand pipe supported in the tank and spaced apart from the bottom of the tank, a suction pipe communicating with the tank, a circulating device connected to said pipe, and a discharge pipe attached to the said device and opening into the tank directly below the stand pipe so that material will be forced up through the stand pipe.

4. A filtering apparatus, comprising a tank adapted to receive the material to be treated and a suitable solution, filtering members arranged within said tank, a stand pipe supported in the tank and spaced from the bottom of the tank, a suction pipe communicating with the tank, a circulating device connected to said pipe, a discharge pipe attached to the said device and opening into the tank, directly below the stand pipe so that material will be forced up through the stand pipe and a pump communicating with said filtering members.

5. A filtering apparatus for the purpose set forth comprising a tank adapted to receive the material to be treated and a suitable solution, a stand pipe within said tank, means communicating with the tank at the top thereof and with the tank at the bottom thereof for withdrawing the solution from and returning it to the tank, thereby forcing the material up through said stand pipe and causing the circulating and agitating of the material, and filtering members arranged within the tank.

6. A filtering apparatus for the purpose set forth comprising a tank adapted to receive the material to be treated and a solution, a stand pipe within said tank, means communicating with the tank at the top thereof and with the tank at the bottom thereof for withdrawing the solution from and returning it to the tank, thereby forcing the material up through said stand pipe and causing the circulating and agitating of the material, filtering members arranged within the tank, and a pump communicating with said filtering members.

7. A filtering apparatus for the purpose set forth, comprising a tank adapted to receive the material to be treated and a solution, a stand pipe within said tank, means communicating with the tank at the top thereof and with the tank at the bottom thereof for withdrawing the solution from and returning it to the tank, thereby forcing the material up through said stand pipe and causing the circulating and agitating of the material, filtering members arranged within the tank, a pump communicating with said filtering members, and a combined aerator and amalgamator carried by the upper end of said stand pipe.

8. A filtering apparatus for the purpose set forth, comprising a tank adapted to receive the material to be treated and a solution, a stand pipe within said tank, means communicating with the tank at the top thereof and with the tank at the bottom thereof for withdrawing the solution from and returning it to the tank, thereby forcing the material up through said stand pipe and causing the circulating and agitating of the material, filtering members arranged within the tank, and a combined aerator and amalgamator carried by the upper end of said stand pipe.

9. A filtering apparatus, comprising a tank, a plurality of leading off pipes within said tank, a plurality of circular filtering members connected to each of said leading off pipes, a common receiving pipe for said leading off pipes, a pump communicating with said receiving pipe, a vertically extending stand pipe arranged within said tank, and a circulating device communicating at one end in the upper portion of the tank and at its other end opening into the bottom of the stand pipe.

10. A filtering apparatus comprising a tank, a plurality of leading off pipes within said tank, a plurality of circular filtering members connected to each of said leading off pipes, a common receiving pipe for said leading off pipes, a pump communicating with said receiving pipe, a vertically extending stand pipe arranged within said tank, a circulating device communicating at one end in the upper portion of the tank and at its other end opening into the bottom of the stand pipe, and a combined aerator and amalgamator carried by the upper end of the stand pipe.

11. A filtering apparatus embodying a plurality of filtering members, each of said members consisting of a hollow tube closed at one end and provided with a plurality of openings, tubular elements surrounding said tube and provided with a plurality of openings, tubular elements surrounding said tube and provided with channels, and an envelop for said elements and tube.

12. A filtering apparatus embodying a plurality of filtering members, each of said members consisting of a hollow tube closed at one end and provided with a plurality of openings, tubular elements surrounding said tube and provided with channels, and an envelop for said elements and tube, combined with a leading off pipe communicating with the open end of the tube.

13. A filtering apparatus comprising a tank provided with a bottom the shape of an inverted cone, a leading off pipe arranged therein and communicating with a pump, and a plurality of circular filtering members opening into said leading off pipe, said members gradually increasing in length towards the center of said tank.

14. A filtering apparatus comprising a tank provided with a bottom the shape of an inverted cone, a leading off pipe arranged therein and communicating with a pump, a plurality of circular filtering members opening into said leading off pipe, said members gradually increasing in length towards the center of said tank, a stand pipe within and spaced from the bottom of said tank, and means opening into said tank at the bottom and adapted to cause the circulation of the material to be treated through the tank and stand pipe.

15. A filtering apparatus comprising a tank provided with a bottom the shape of an inverted cone, a leading off pipe arranged therein and communicating with a pump, a plurality of circular filtering members opening into said leading off pipe, said members gradually increasing in length towards the center of said tank, a stand pipe within and spaced from the bottom of said tank, means opening into said tank at the bottom for causing the circulation of the material to be treated through the tank and stand pipe, an L-shaped discharge pipe for said tank, and means for closing said discharge pipe.

16. A filtering apparatus of the class described comprising a plurality of filtering members, a suction device communicating therewith, a stand pipe, a receptacle for said members and stand pipe, and means communicating with the top and bottom of the tank and adapted to force the material up through the stand pipe thereby causing the circulating and agitating of the material.

17. A filtering apparatus comprising a tank, a plurality of filtering members arranged therein, a leading-off pipe communicating with said members, a stand pipe within the tank, means opening into said tank at the bottom and top for causing a circulation of the material to be treated through the tank and spaced from the bottom thereof and stand pipe, a discharge pipe for the tank, and means for closing the discharge pipe.

18. A filtering apparatus comprising a tank, a plurality of filtering members arranged therein, a leading-off means communicating with said members, a stand-pipe within the tank and spaced from the bottom thereof, and means opening into said tank at the bottom and top for causing a circulation of the material to be treated through the tank and stand-pipe.

19. A filtering apparatus comprising a tank, a plurality of filtering members arranged therein, a leading-off means communicating with said members, a stand-pipe within the tank and spaced from the bottom thereof, means opening into said tank at the bottom and top for causing a circulation of the material to be treated through the tank stand-pipe, a discharge pipe for the tank, and means for closing the discharge pipe.

20. A filtering apparatus comprising a tank provided with a bottom the shape of an inverted cone, a leading-off means arranged therein, a plurality of filtering members opening into said leading-off means, said members gradually increasing in length towards the center of the tank, a stand-pipe within and spaced from the bottom of the tank, and means opening into said tank at the top and bottom thereof for causing a circulation of the material to be treated through the tank and stand-pipe.

In testimony whereof I have hereunto set my hand in presence of two subscribing witnesses.

HARRY P. TAYLOR.

Witnesses:
  CLYDE H. JAY,
  L. N. TAYLOR.